United States Patent
Noureldin et al.

(10) Patent No.: US 10,989,078 B2
(45) Date of Patent: Apr. 27, 2021

(54) NATURAL GAS LIQUID FRACTIONATION PLANT WASTE HEAT CONVERSION TO SIMULTANEOUS POWER AND COOLING CAPACITIES USING INTEGRATED ORGANIC-BASED COMPRESSOR-EJECTOR-EXPANDER TRIPLE CYCLES SYSTEM

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/669,087

(22) Filed: Oct. 30, 2019

(65) Prior Publication Data
US 2020/0063608 A1 Feb. 27, 2020

Related U.S. Application Data

(63) Continuation of application No. 15/842,153, filed on Dec. 14, 2017, now Pat. No. 10,494,958.
(Continued)

(51) Int. Cl.
*F01K 27/02* (2006.01)
*C10G 7/00* (2006.01)
(Continued)

(52) U.S. Cl.
CPC ............ *F01K 27/02* (2013.01); *B01D 1/0058* (2013.01); *B01D 1/26* (2013.01); *B01D 3/065* (2013.01);
(Continued)

(58) Field of Classification Search
CPC ........... F01K 27/02; F01K 25/10; C10G 5/06; C10G 7/00; B01D 1/0058; B01D 1/26;
(Continued)

(56) References Cited

U.S. PATENT DOCUMENTS

| 4,002,525 A | 1/1977 | Baierl et al. |
| 4,907,410 A | 3/1990 | Chang |

(Continued)

FOREIGN PATENT DOCUMENTS

| WO | 2006039182 | 4/2006 |
| WO | 2012003525 | 1/2012 |

(Continued)

OTHER PUBLICATIONS

GCC Examination Report issued in Gulf Cooperation Council Application No. GC 2018-35795 dated Jun. 21, 2020, 3 pages.
(Continued)

*Primary Examiner* — Brian A McCaig
(74) *Attorney, Agent, or Firm* — Fish & Richardson P.C.

(57) ABSTRACT

Recovering heat from a Natural Gas Liquid (NGL) fractionation plant via a waste heat recovery heat exchanger network including heating a buffer fluid in a heat exchanger with a stream from the NGL fractionation plant and discharging the heated buffer fluid to an integrated triple cycle system. Generating cooling capacity for the NGL fractionation plant via the integrated triple cycle system with heat from the buffer fluid.

21 Claims, 15 Drawing Sheets

PROPANE DEHYDRATOR SECTION WASTE HEAT RECOVERY SYSTEM

Related U.S. Application Data

(60) Provisional application No. 62/542,687, filed on Aug. 8, 2017.

(51) Int. Cl.
| | |
|---|---|
| *B01D 1/26* | (2006.01) |
| *B01D 1/00* | (2006.01) |
| *B01D 3/14* | (2006.01) |
| *B01D 3/06* | (2006.01) |
| *C10G 5/06* | (2006.01) |
| *C02F 1/16* | (2006.01) |
| *F25B 27/02* | (2006.01) |
| *F28D 21/00* | (2006.01) |
| *F01K 25/10* | (2006.01) |
| *B01D 53/00* | (2006.01) |
| *B01D 53/14* | (2006.01) |
| *B01D 53/26* | (2006.01) |
| *C02F 103/08* | (2006.01) |

(52) U.S. Cl.
CPC ............... *B01D 3/146* (2013.01); *C02F 1/16* (2013.01); *C10G 5/06* (2013.01); *C10G 7/00* (2013.01); *F25B 27/02* (2013.01); *F28D 21/0001* (2013.01); *B01D 53/002* (2013.01); *B01D 53/1456* (2013.01); *B01D 53/263* (2013.01); *C02F 2103/08* (2013.01); *F01K 25/10* (2013.01); *F28D 2021/0019* (2013.01)

(58) Field of Classification Search
CPC ...... B01D 3/065; B01D 3/146; B01D 53/002; B01D 53/1456; B01D 53/263; Y02P 70/10; C02F 1/16; F25B 27/02; F28D 21/0001
See application file for complete search history.

(56) References Cited

U.S. PATENT DOCUMENTS

| | | | |
|---|---|---|---|
| 5,600,049 A | 2/1997 | Sy | |
| 5,685,152 A | 11/1997 | Sterling | |
| 6,216,436 B1 | 4/2001 | Ranasinghe | |
| 7,257,966 B2 | 8/2007 | Lee et al. | |
| 7,458,231 B1 | 12/2008 | Vanden | |
| 8,776,703 B2 | 7/2014 | Hall | |
| 9,598,993 B2 | 3/2017 | Younes et al. | |
| 9,657,937 B2 | 5/2017 | Niass | |
| 9,745,871 B2 | 8/2017 | Noureldin et al. | |
| 9,828,885 B2 | 11/2017 | Noureldin et al. | |
| 9,851,153 B2 | 12/2017 | Noureldin et al. | |
| 9,879,918 B2 | 1/2018 | Noureldin et al. | |
| 9,891,004 B2 | 2/2018 | Noureldin et al. | |
| 10,690,407 B2 | 6/2020 | Noureldin et al. | |
| 10,851,679 B2 | 12/2020 | Noureldin et al. | |
| 2002/0166336 A1* | 11/2002 | Wilkinson | C10G 5/06 62/620 |
| 2006/0065015 A1 | 3/2006 | Mccoy | |
| 2008/0174115 A1 | 7/2008 | Lambirth | |
| 2008/0190135 A1 | 8/2008 | Mak | |
| 2008/0289588 A1 | 11/2008 | Wees et al. | |
| 2009/0000299 A1 | 1/2009 | Ast et al. | |
| 2010/0326131 A1 | 12/2010 | Lengert | |
| 2011/0000205 A1 | 1/2011 | Hauer | |
| 2013/0341929 A1 | 12/2013 | Ho | |
| 2014/0037510 A1 | 2/2014 | Peng et al. | |
| 2014/0090405 A1 | 4/2014 | Held et al. | |
| 2014/0223911 A1 | 8/2014 | Ikegami | |
| 2015/0377076 A1 | 12/2015 | Giegel et al. | |
| 2015/0377079 A1 | 12/2015 | Noureldin et al. | |
| 2016/0369674 A1 | 12/2016 | Younes et al. | |
| 2017/0058708 A1 | 3/2017 | Noureldin et al. | |
| 2017/0058711 A1 | 3/2017 | Noureldin et al. | |
| 2017/0058719 A1 | 3/2017 | Noureldin et al. | |
| 2017/0058721 A1 | 3/2017 | Noureldin et al. | |
| 2019/0048759 A1 | 2/2019 | Noureldin et al. | |

FOREIGN PATENT DOCUMENTS

| | | |
|---|---|---|
| WO | 2017035150 | 3/2017 |
| WO | 2017035166 | 3/2017 |

OTHER PUBLICATIONS

GCC Examination Report issued in Gulf Cooperation Council Application No. GC 2018-35799 dated Jun. 22, 2020, 4 pages.
Chinese Office Action in Chinese Appln. No. 201880061406.7, dated Sep. 18, 2020, 17 pages, English Translation.
Chinese Office Action in Chinese Appln. No. 201880063810.8, dated Sep. 21, 2020, 16 pages, English Translation.
Tong, "Introduction on Light Hydrocarbon Recovery Process in Onshore Terminal of the Chunxiao Gas Field," Natural Gas Technology, 2007, 1(1), 7 pages, English Abstract.
Gulf Cooperation Council Examination Report issued in GCC Application No. GC 2018-35802 dated Dec. 30, 2019, 6 pages.
Gulf Cooperation Council Examination Report issued in GCC Application No. GC 2018-35793 dated Dec. 30, 2019, 5 pages.
Gulf Cooperation Council Examination Report issued in GCC Application No. GC 2018-35800 dated Dec. 30, 2019, 5 pages.
International Search Report and Written Opinion issued in International Application No. PCT/US2018/045554 dated Nov. 22, 2018, 21 pages.
International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018, 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018, 20 pages.
International Search Report and Written Opinion issued in International Application No. PCT/US2018/045640 dated Nov. 22, 2018, 19 pages.
International Search Report and Written Opinion issued in International Application No. PCT/US2018/045535 dated Nov. 22, 2018, 23 pages.
International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Ammar et al., "Low grade thermal energy sources and uses from the process industry in the UK," Applied Energy, Elsevier Science Publishers, vol. 89, No. 1, Jun. 1, 2011, 18 pages.
Bahnassi et al., "Achieving product specifications for ethane through to pentane plus from NGL fraction plants," AIChE Fall Conference, Jan. 1, 2005, 21 pages.

(56) References Cited

OTHER PUBLICATIONS

Gaberiel et al., "Optimization across the water-energy nexus for integrating heat, power, and water for industrial processes, couples with the hybrid thermal-membrane dealination," Industrial and Engineering Chemistry Research, vol. 55, No. 12, Feb. 16, 2016, 25 pages.
Gnaneswar Gude et al., "Feasibility study of a new two-stage low temperature desalination process," Energy Conversation and Management, Elsevier Science Publishers, vol. 56, Nov. 30, 2011, 7 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry Research, vol. 53, No. 7, Feb. 4, 2014, 19 pages.
M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Ophir et al., "Advanced MED process for most economical sea water desalination," Desalination, Elsevier, Amsterdam, NL, vol. 182, No. 1-3, Nov. 1, 2005, 12 pages.
Rahimi et al., "A novel process for low grade heat driven desalination," Desalination, Oct. 15, 2014, vol. 351, pp. 202-212.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Zhu et al., "Hybrid vapor compression refrigeration system with an integrated ejector cooling cycle," International Journal of Refrigeration, vol. 35, 1, pp. 68-78 11 pages.
GCC Examination Report in GCC Appln. No. GC 2018-35801, dated Apr. 28, 2020, 3 pages.
GCC Examination Report in GCC Appln. No. GC 2018-35794, dated May 30, 2020, 3 pages.
GCC Examination Report in GCC Appln. No. GC 2018-357994, dated Jan. 29, 2020, 6 pages.
Gulf Cooperation Council Examination Report issued in GCC Application No. GC 2018-35796 dated Dec. 30, 2019, 5 pages.
GCC Examination Report in GCC Appln. No. GC 2018-35801, dated Feb. 9, 2020, 4 pages.
GCC Examination Report in GCC Appln. No. GC 2018-35799, dated Feb. 9, 2020, 4 pages.
GCC Examination Report in GCC Appln. No. GC 2018-35795, dated Feb. 9, 2020, 3 pages.
CN Office Action in Chinese Appln. No. 201880064324.8, dated Oct. 28, 2020, 12 pages (With English Translation).
CN Office Action in Chinese Appin. No. 201880064998.8, dated Nov. 24, 2020, 8 pages (With English Translation).
CN Office Action in Chinese Appln. No. 201880063809.5, dated Dec. 7, 2020, 13 pages (With English Translation).
CN Office Action in Chinese Appln. No. 201880063863, dated Dec. 7, 2020, 15 pages (With English Translation).
CN Office Action in Chinese Appln. No. 201880065047.2, dated Dec. 9, 2020, 13 pages (With English Translation).
GCC Examination Report in GCC Appln. No. GC 2018-35795, dated Oct. 28, 2020, 4 pages.
GCC Examination Report in GCC Appin. No. GC 2018-35799, dated Oct. 28, 2020, 3 pages.

\* cited by examiner

NATURAL GAS LIQUID FRACTIONATION PLANT WASTE HEAT CONVERSION TO SIMULTANEOUS POWER AND COOLING CAPACITIES USING INTEGRATED ORGANIC-BASED COMPRESSOR-EJECTOR-EXPANDER TRIPLE CYCLES SYSTEM

CROSS-REFERENCE TO RELATED APPLICATIONS

This disclosure is a continuation of U.S. application Ser. No. 15/842,153 which was filed on Dec. 14, 2017 and which claims the benefit of priority to U.S. Application Ser. No. 62/542,687 entitled "Utilizing Waste Heat Recovered From Natural Gas Liquid Fractionation Plants", which was filed on Aug. 8, 2017, the entire contents of which are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
| --- | --- |
| Degrees Celsius | ° C. |
| Megawatts | MW |
| One million | MM |
| British thermal unit | Btu |
| Hour | h |

TABLE 1-continued

| Unit of Measure | Abbreviation |
| --- | --- |
| Pounds per square inch (pressure) | psi |
| Kilogram (mass) | Kg |
| Second | S |
| Cubic meters per day | m³/day |
| Fahrenheit | F. |

Certain aspects of the subject matter described here can be implemented as a system. In an example implementation, the system includes a first waste heat recovery heat exchanger network thermally coupled to multiple heat sources of a Natural Gas Liquid (NGL) fractionation plant. The first heat exchanger network is configured to transfer at least a portion of heat generated at the multiple heat sources to a first buffer fluid flowed through the first heat exchanger network. The system includes an integrated triple cycle system configured to generate cooling capacity to cool one or more heat sources of the plurality of heat sources. The system includes a second waste heat recovery heat exchanger network thermally coupled to the integrated triple cycle system, and configured to vaporize at least a portion of a second buffer fluid flowed through the integrated triple cycle system.

In an aspect combinable with the example implementation, the system includes a control system connected to the first heat exchanger network, the integrated triple cycle system and the second heat exchanger network, and configured to flow fluids between at least two or more of the NGL fractionation plant, the first heat exchanger network, the second heat exchanger network and the integrated triple cycle system.

In another aspect combinable with any of the previous aspects, the fluids include one or more of a NGL fractionation plant stream or a buffer fluid.

In another aspect combinable with any of the previous aspects, the buffer fluid includes at least one of water, oil or refrigerant.

In another aspect combinable with any of the previous aspects, the refrigerant includes propane.

In another aspect combinable with any of the previous aspects, the multiple heat sources include a first multiple sub-units of the NGL fractionation plant including a propane dehydration section, a de-propanizer section, a butane de-hydrator section, and a de-butanizer section, a second multiple sub-units of the NGL fractionation plant including a de-pentanizer section, an Amine-Di-Iso-Propanol (ADIP) regeneration section, a natural gas de-colorizing section, a propane vapor recovery section and a propane product refrigeration section, and a third multiple sub-units of the NGL fractionation a propane product sub-cooling section, a butane product refrigeration section, an ethane production section and a Reid Vapor Pressure (RVP) control section.

In another aspect combinable with any of the previous aspects, the first heat exchanger network includes multiple heat exchangers.

In another aspect combinable with any of the previous aspects, the multiple heat exchangers include a first subset including one or more of the multiple heat exchangers thermally coupled to the first plurality of sub-units of the NGL fractionation plant. The first subset includes a first heat exchanger thermally coupled to the propane dehydration section and configured to heat a first buffer stream using heat carried by a propane de-hydration outlet stream from the propane de-hydration section, a second heat exchanger thermally coupled to the de-propanizer section and configured to heat a second buffer stream using heat carried by a de-propanizer overhead outlet stream from the de-propanizer section, a third heat exchanger thermally coupled to the butane de-hydrator section and configured to heat a third buffer stream using heat carried by a butane de-hydrator outlet stream, a fourth heat exchanger thermally coupled to the de-butanizer section and configured to heat a fourth buffer stream using heat carried by a de-butanizer overhead outlet stream from the de-butanizer section, and a fifth heat exchanger thermally coupled to the de-butanizer section and configured to heat a fifth buffer stream using heat carried by a de-butanizer bottoms outlet stream from the de-butanizer section.

In another aspect combinable with any of the previous aspects, the multiple heat exchangers includes a second subset including one or more of the multiple heat exchangers thermally coupled to the second multiple sub-units of the NGL fractionation plant.

In another aspect combinable with any of the previous aspects, the second subset includes a sixth heat exchanger thermally coupled to the de-pentanizer section and configured to heat a sixth buffer stream using heat carried by a de-pentanizer overhead outlet stream from the de-pentanizer section, a seventh heat exchanger thermally coupled to the ADIP regeneration section and configured to heat a seventh buffer stream using heat carried by an ADIP regeneration section overhead outlet stream, an eighth heat exchanger thermally coupled to the ADIP regeneration section and configured to heat an eighth buffer stream using heat carried by an ADIP regeneration section bottoms outlet stream, a ninth heat exchanger thermally coupled to the natural gas de-colorizing section and configured to heat a ninth buffer stream using heat carried by a natural gas de-colorizing section pre-flash drum overhead outlet stream, a tenth heat exchanger thermally coupled to the natural gas de-colorizing section and configured to heat a tenth buffer stream using heat carried by a natural gas de-colorizer overhead outlet stream, an eleventh heat exchanger thermally coupled to the propane vapor recovery section and configured to heat an eleventh buffer stream using heat carried by a propane vapor recovery compressor outlet stream, and a twelfth heat exchanger thermally coupled to the propane product refrigeration section and configured to heat a twelfth buffer stream using heat carried by a propane refrigeration compressor outlet stream from the propane product refrigeration section.

In another aspect combinable with any of the previous aspects, the multiple heat exchangers includes a third subset comprising one or more of the multiple heat exchangers thermally coupled to the third multiple sub-units of the NGL fractionation plant.

In another aspect combinable with any of the previous aspects, the third subset includes a thirteenth heat exchanger thermally coupled to the propane product sub-cooling and configured to heat a thirteenth buffer stream using heat carried by a propane main compressor outlet stream from the propane product sub-cooling section, a fourteenth heat exchanger thermally coupled to the butane product refrigeration section and configured to heat a fourteenth buffer stream using heat carried by a butane refrigeration compressor outlet stream from the butane product refrigeration section, a fifteenth heat exchanger thermally coupled to the ethane production section and configured to heat a fifteenth buffer stream using heat carried by an ethane dryer outlet stream, and a sixteenth heat exchanger thermally coupled to the RVP control section and configured to heat a sixteenth buffer stream using heat carried by a RVP control column overhead outlet stream.

In another aspect combinable with any of the previous aspects, the system includes a first storage tank configured to store the buffer streams.

In another aspect combinable with any of the previous aspects, the control system is configured to flow the buffer streams from the first storage tank to the first heat exchanger network.

In another aspect combinable with any of the previous aspects, the integrated triple cycle system includes a mechanical compression cycle, an Organic Rankine Cycle (ORC) and an ejector cycle.

In another aspect combinable with any of the previous aspects, the system includes a second storage tank configured to store a second buffer stream. The control system is configured to flow the heated buffer stream from the first heat exchanger network to the integrated triple cycle system, and to flow the buffer stream from the second storage tank to the integrated triple cycle system.

In another aspect combinable with any of the previous aspects, the second heat exchanger network includes a seventeenth heat exchanger configured to receive the second buffer stream from the second storage tank and the heated buffer stream from the first heat exchanger network, and to heat the second buffer stream using at least a portion of heat carried by the heated buffer stream.

In another aspect combinable with any of the previous aspects, the mechanical compression cycle of the integrated triple cycle system is configured to generate cooling capacity for one or more heat sources of the plurality of heat sources using the heated second buffer stream.

In another aspect combinable with any of the previous aspects, the second heat exchanger network includes an eighteenth heat exchanger configured to receive the second buffer stream from the second storage tank and to receive a de-ethanizer overhead stream from refrigeration compressors in the NGL fractionation plant, and to heat the second buffer stream using the de-ethanizer overhead stream.

In another aspect combinable with any of the previous aspects, the ORC of the integrated triple cycle system is configured to generate power using the heated second buffer stream.

In another aspect combinable with any of the previous aspects, the control system is configured to flow the buffer stream exiting the seventeenth heat exchanger to the first storage tank.

In another aspect combinable with any of the previous aspects, the control system is configured to flow the buffer stream exiting the second heat exchanger network to the second storage tank.

The details of one or more implementations of the subject matter described in this specification are set forth in the accompanying drawings and the detailed description. Other features, aspects, and advantages of the subject matter will become apparent from the description, the drawings, and the claims.

BRIEF DESCRIPTION OF THE DRAWINGS

FIG. 1O is a schematic diagram of a mono-refrigerant triple vapor compression-ejector-expander cycle.

DETAILED DESCRIPTION

NGL Plant

Figure 1A:
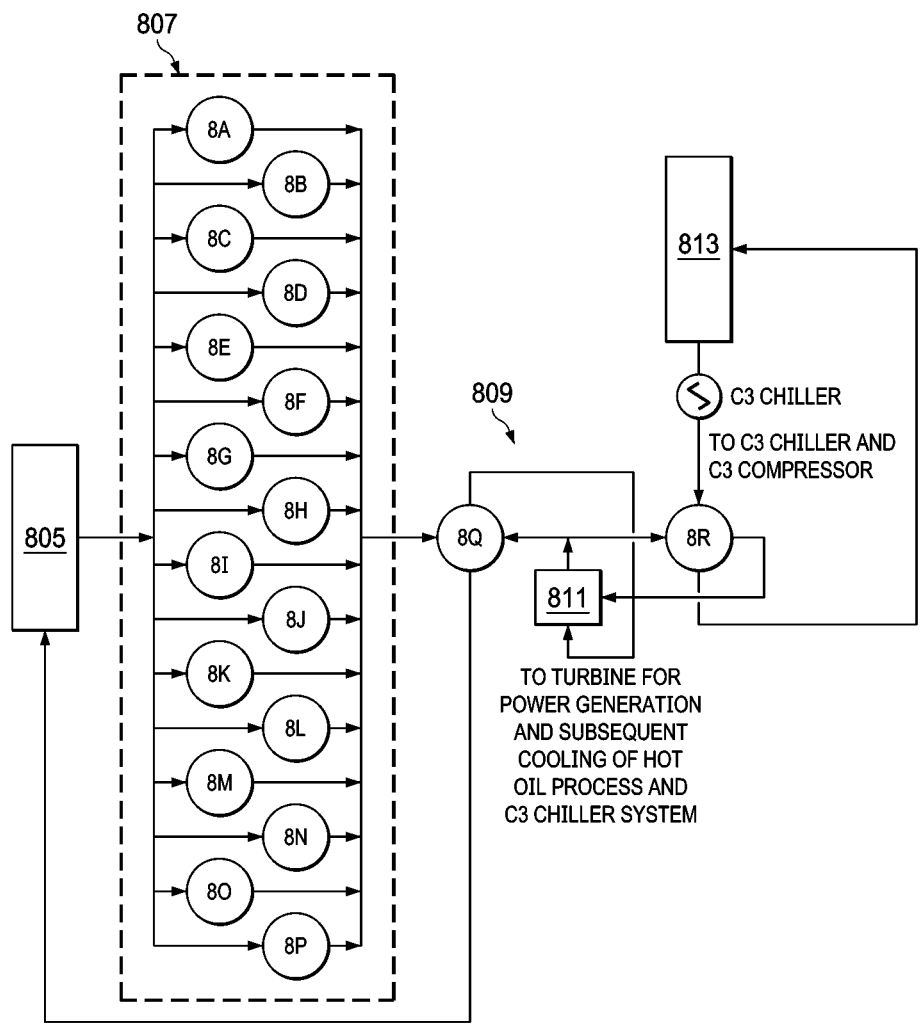
FIG. 1A is a schematic diagram of an example of a low grade waste heat recovery system.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a de-pentanizer condenser, an amine-di-iso-propanol (ADIP) cooler, a regenerator overhead (OVHD) condenser, a Reid vapor pressure (RVP) column condenser, a de-propanizer condenser, a de-butanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG de-colorizer condenser, or combinations thereof.

Fractionation Section

Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. De-ethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL". De-propanizing and de-butanizing separate propane and butane, respectively, from C3+ NGL and C4+NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the de-ethanizer, about 50 trays in the de-propanizer, and about 55 trays in the de-butanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the de-ethanizing module, the de-propanizing module and the de-butanizing module, each of which is described later.

De-Ethanizer Module (or De-Ethanizer Column)

The C2+ NGL is pre-heated before entering the de-ethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the de-ethanizer reboiler is C3+ NGL, which is sent to the de-propanizer module.

De-Propanizer Module (or De-Propanizer Column)

From the de-ethanizer module, C3+ NGL enters the de-propanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the de-butanizer module De-Butanizer Module (or De-Butanizer Column)

C4+ enters the de-butanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two de-hydrators containing molecular sieve desiccant beds. One de-hydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the de-hydrator, dry C3/C4 products flow to refrigeration.

Natural Gasoline (NG) Processing Section

NG processing includes RVP control, de-colorizing and de-pentanizing sections.

RVP Control Section

A Reid vapor pressure (RVP) control section (or rerun unit) is a fractionator column that receives the C5+NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

De-Colorizing Section

The de-colorizing section removes color bodies from NG. Color bodies are traces of heavy ends found in the debutanizer bottoms product. Other impurities such as corrosion products from the pipeline may also be present. These must be removed for NG to meet the color specification. De-colorizer feed can be RVP column bottoms product or de-butanizer bottoms product, or a combination of both. Additional natural gasoline can also be supplied from other facilities to maintain a hexane plus (C6+) product supply. If de-colorizing is needed, NG first passes through a pre-flash-drum. A large portion of the lighter NG components vaporizes and leaves the drum as overhead. The heavier NG components remain along with the color bodies and are fed to the de-colorizer column, where the remaining color bodies are separated. The NG leaves the de-colorizer as overhead gas and is condensed and collected in the NG product drum, with some pumped back to the column as reflux. Overhead from the column and flash drum are joined and pumped to either the de-pentanizer (described later) or cooled and sent to storage in the feed product surge unit. The color bodies leave the de-colorizer as bottoms product and are pumped to the feed and surge unit to be injected into a crude line.

De-Pentanizing Section

De-pentanizing uses a fractionation column to produce a pentane overhead product and a C6+ bottoms product. Both the pentane product and the C6+ bottoms product are separately fed to storage or downstream the petrochemical plants. The feed to the de-pentanizer is the NG product stream from the de-colorizing section. Feed can be increased or decreased based on the demand for C6+ bottoms product. If the NGL fractionation plant NG production cannot meet demand, NG can be imported from oil refineries. The de-colorized NG is preheated before entering the de-pentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the de-pentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
| --- | --- |
| Propane refrigerant condenser | 94 |
| Propane de-hydration condenser | 22 |
| Butane de-hydrator condenser | 9 |
| Naphtha cooler | 11 |
| De-pentanizer condenser | 100 |
| ADIP cooler | 73 |
| Regenerator OVHD condenser | 18 |
| NG flash vapor condenser | 107 |
| NG de-colorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| De-propanizer condenser | 194 |
| De-butanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m$^3$/day (for example, 120,000 m$^3$/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or other cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

In some implementations, the techniques described here can be implemented using a waste heat recovery network that includes 16 heat exchanger units distributed in specific areas of the NGL fractionation plant. As described later, low grade waste heat can be recovered from several processing units at which the heat exchanger units are installed using a buffer stream, for example, pressurized water, pressurized liquid propane, oil or such buffer streams. The pressurized oil can flow from a dedicated storage tank at a temperature of between 115° F. and 125° F. (for example, a temperature of 120° F.) towards specific units in the NGL fractionation plant to recover a specific amount of thermal energy.

The techniques can be implemented to increase the temperature of the pressurized hot oil stream from about 120° F. to between 160° F. and 170° F. (for example, 165° F.). The heated oil stream is then used to drive a customized triple cycles system (described later) to produce between 35 MW and 40 MW (for example, 37.5 MW) of power and between 60 MM Btu/h and 70 MM Btu/h (for example, 63 MM Btu/h) of sub-ambient cooling. The hot oil stream temperature is reduced in the triple cycles system to between 115° F. and 125° F. (for example, 120° F.), and the stream is flowed back to the hot oil storage tank. The techniques can also be implemented to flow a second buffer fluid, for example, high pressure liquid propane at a temperature between 85° F. and 95° F. (for example, 88° F.) from a dedicated storage tank towards two heat exchangers (described later). In a first of the two heat exchangers, high pressure liquid propane is vaporized using heat from the heated oil, used to power a turbine, then cooled by water, and is subsequently returned to the dedicated storage tank. In a second of the two heat exchangers, the high pressure liquid propane is heated using thermal energy from the discharge of a propane compressor for the NGL fractionation plant de-ethanizer overhead condensation (described later). The vaporized propane is in part flowed for the ejector as a motive stream (described later) and in part used to power the turbine.

FIG. 1A is a schematic diagram of an example of a low grade waste heat recovery system. The schematic includes a storage tank 805 to store buffer fluid of a first type, for example, pressurized water, oil, or such buffer fluid. The buffer fluid is flowed to a heat exchanger network 807 which, in some implementations, can include 16 heat exchangers (for example, heat exchangers 8a, 8b, 8c, 8d, 8e, 8f, 8g, 8h, 8i, 8j, 8k, 8l, 8m, 8n, 8o and 8p), which are described in detail later. The buffer fluid is flowed through the heat exchanger network 807 and heated by streams in the NGL fractionation plant (described later). The schematic includes a first storage tank 811 and a second storage tank 813, each to store buffer fluid of a second type, for example, pressurized propane. The buffer fluid from the second storage tank 813 is flowed through a mono-refrigerant integrated vapor compression-ejector-expander triple cycle 809, in which the buffer fluid is vaporized using heat exchanger 8r. The buffer fluid from the first storage tank 811 is used flowed through heat exchanger 8q to extract thermal energy collected by the heat exchanger network 807 and sent to a turbine for power generation, then cooled by a water cooler, before being returned to the first storage tank 811. The buffer fluid of the first type is then returned to the storage tank 805. The triple cycle 809 can be implemented to generate cooling capacity for one or more sub-units of the NGL fractionation plant or to generate power or combinations of them.

Figure 1B:
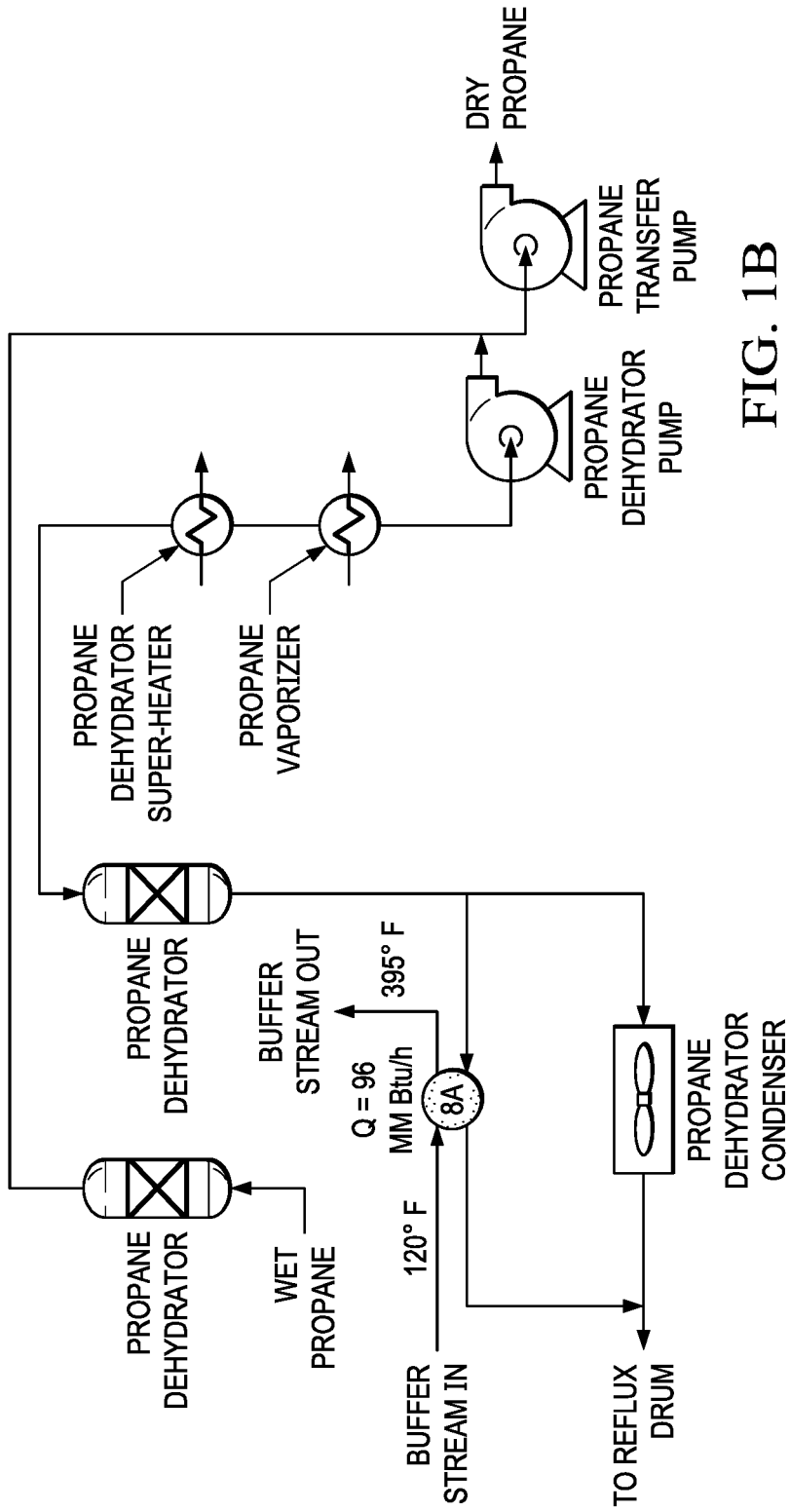
FIG. 1B is a schematic diagram of a de-hydrator section waste heat recovery system in the NGL fractionation plant.

FIG. 1B is a schematic diagram of a propane de-hydrator section waste heat recovery system in the NGL fractionation plant. A first heat exchanger 8a is located in the propane de-hydrator section of the NGL fractionation plant. In some implementations, the buffer fluid in the storage tank 805 is hot oil at a temperature of between 115° F. and 125° F. (for example, 120° F.). The buffer fluid stream flows from the storage tank 805 to the first heat exchanger 8a to cool down the propane de-hydrator outlet stream. In turn, the temperature of the buffer fluid stream increases to between 390° F. and 400° F. of (for example, about 395° F.). The heated oil stream flows to the collection header to join other hot oil streams to flow to the triple cycle 809. The total thermal duty of the first heat exchanger 8a is between 95 MM Btu/h and 100 MM Btu/h (for example, about 96 MM Btu/h).

Figure 1C:
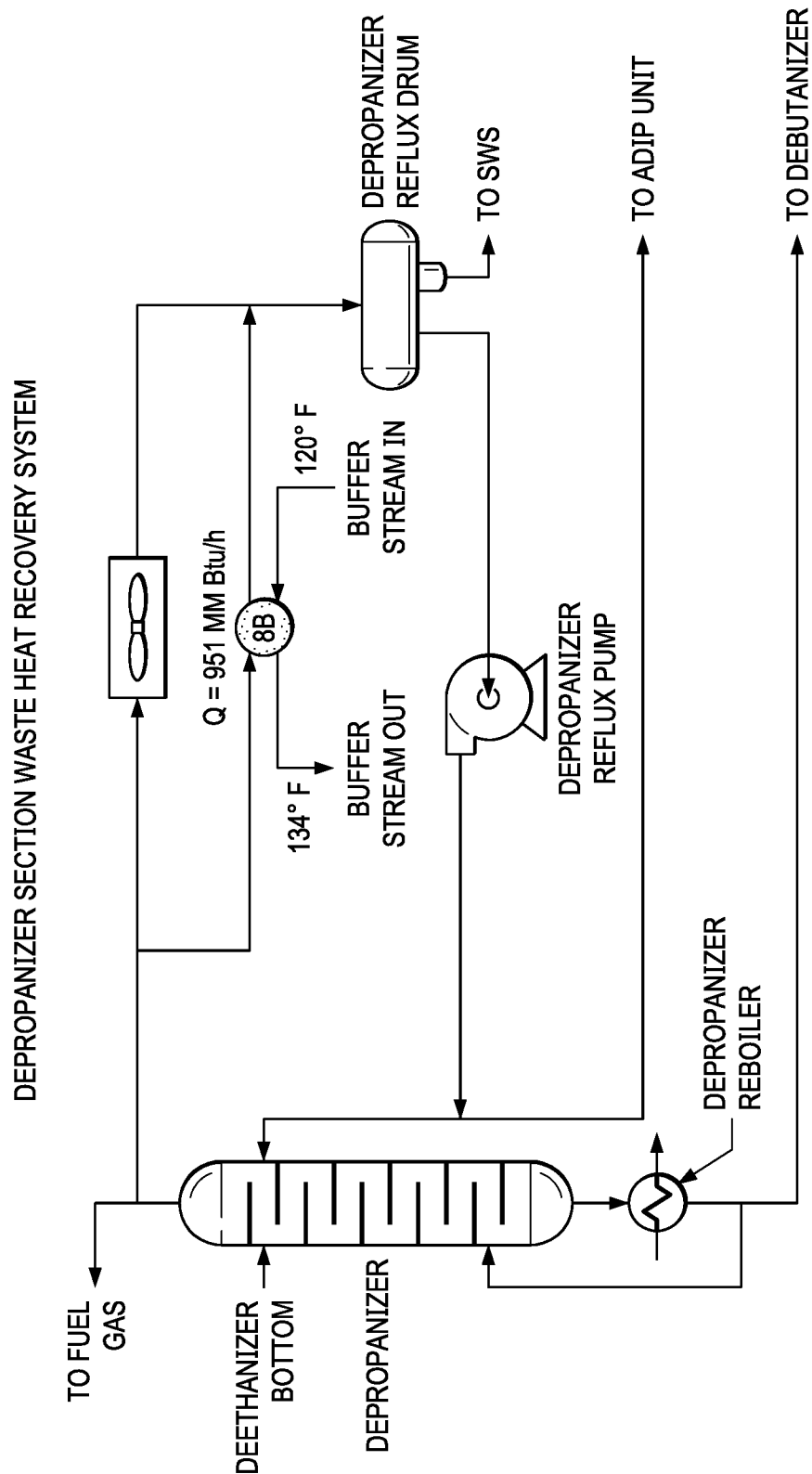
FIG. 1C is a schematic diagram of a de-propanizer section waste heat recovery system in the NGL fractionation plant.

FIG. 1C is a schematic diagram of a de-propanizer section waste heat recovery system in the NGL fractionation plant. A second heat exchanger 8b is located in the de-propanizer section of the NGL fractionation plant. The buffer fluid flows from the storage tank 805 to the second heat exchanger 8b to cool down the de-propanizer overhead outlet stream. In turn, the temperature of the buffer fluid stream increases to between 130° F. and 140° F. (for example, about 136° F.). The heated buffer fluid flows to the collection header to join other hot oil streams to flow to the triple cycle 809. The total thermal duty of the second heat exchanger 6b is between 950 MM Btu/h and 960 MM Btu/h (for example, about 951 MM Btu/h).

Figure 1D:
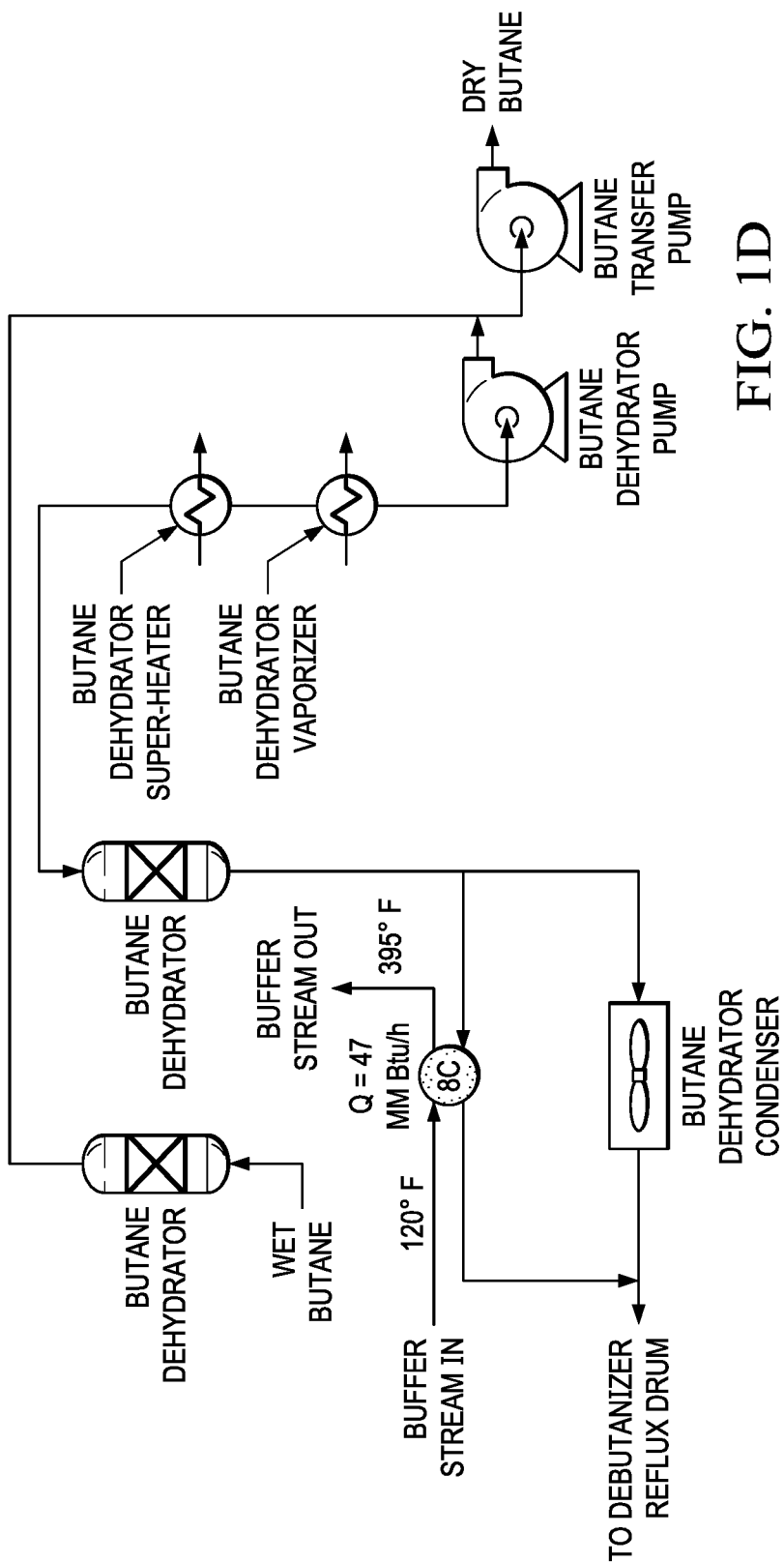
FIG. 1D is a schematic diagram of a butane de-hydrator section waste heat recovery system in the NGL fractionation plant.

FIG. 1D is a schematic diagram of a butane de-hydrator section waste heat recovery system in the NGL fractionation plant. A third heat exchanger 8c is located in the butane de-hydrator section of the NGL fractionation plant. The buffer fluid stream flows from the storage tank 805 to the third heat exchanger 8c to cool down the butane de-hydrator outlet stream. In turn, the temperature of the buffer fluid stream increases to between 390° F. and 400° F. (for example, about 395° F.). The heated buffer fluid stream flows to the collection header to join other hot oil streams to flow to the triple cycle 809. The total thermal duty of the third heat exchanger 8c is between 40 MM Btu/h and 50 MM Btu/h (for example, about 47 MM Btu/h).

Figure 1E:
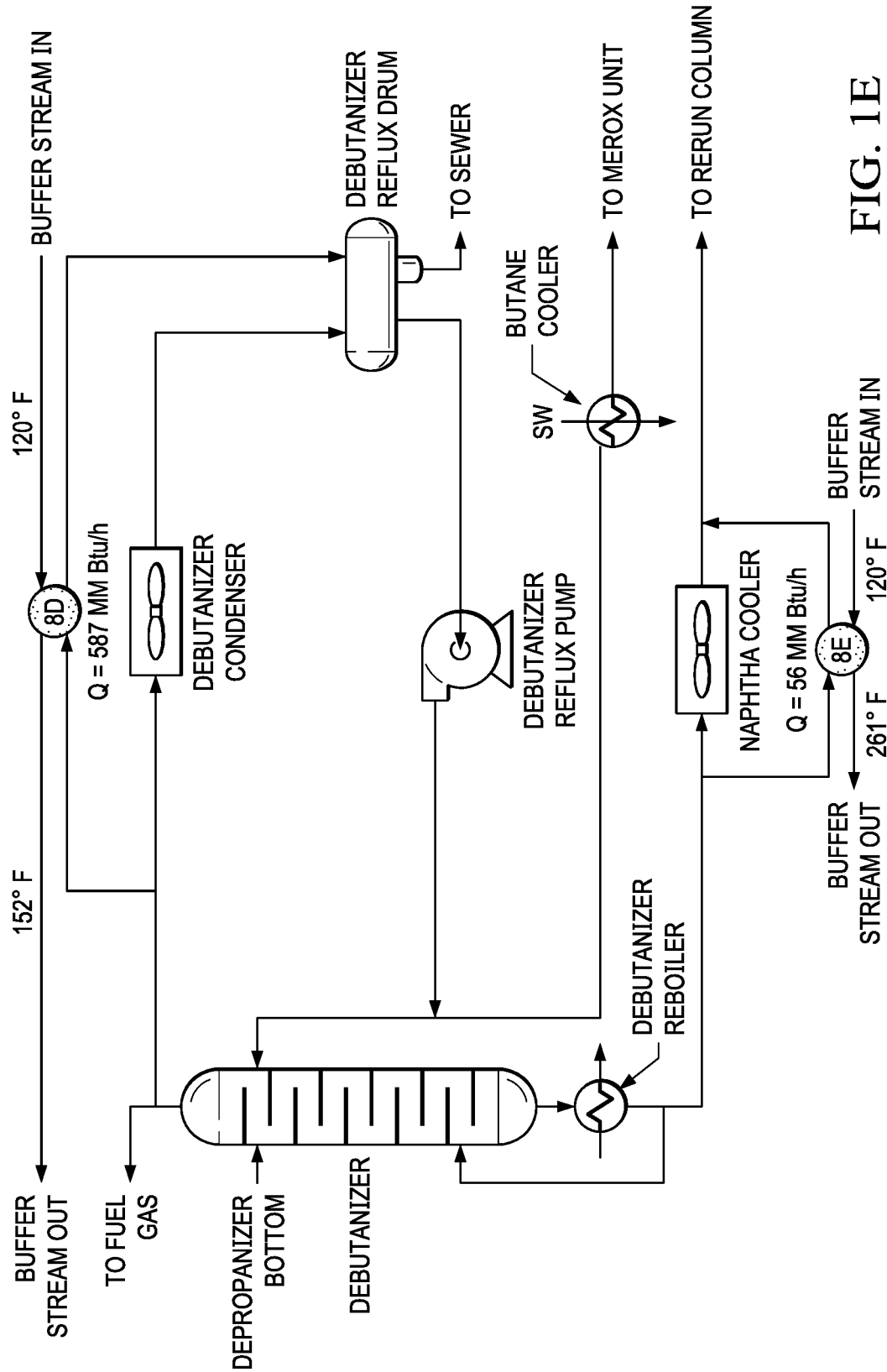
FIG. 1E is a schematic diagram of a de-butanizer section waste heat recovery system in the NGL fractionation plant.

FIG. 1E is a schematic diagram of a de-butanizer section waste heat recovery system in the NGL fractionation plant. A fourth heat exchanger 8d is located in the de-butanizer section of the NGL fractionation plant. The buffer fluid stream flows from the storage tank 805 to the fourth heat exchanger 8d to cool down the de-butanizer overhead outlet stream. In turn, the temperature of the buffer fluid stream increases to between 150° F. and 160° F. (for example, about 152° F.). The heated buffer fluid stream flows to the collection header to join other hot oil streams to flow to the triple cycle 809. The total thermal duty of the fourth heat exchanger 8d is between 580 MM Btu/h and 590 MM Btu/h (for example, about 587 MM Btu/h).

A fifth heat exchanger 8e is located in the de-butanizer section of the NGL fractionation plant. The buffer fluid stream flows from the storage tank 805 to the fifth heat exchanger 8e to cool down the de-butanizer bottoms outlet stream. In turn, the temperature of the buffer fluid stream increases to between 255° F. and 265° F. (for example, about 261° F.). The heated buffer fluid stream flows to the collection header to join other buffer fluid streams to flow to the triple cycle 809. The total thermal duty of the fifth heat exchanger 8e is between 50 MM Btu/h and 60 MM Btu/h (for example, about 56 MM Btu/h).

Figure 1F:
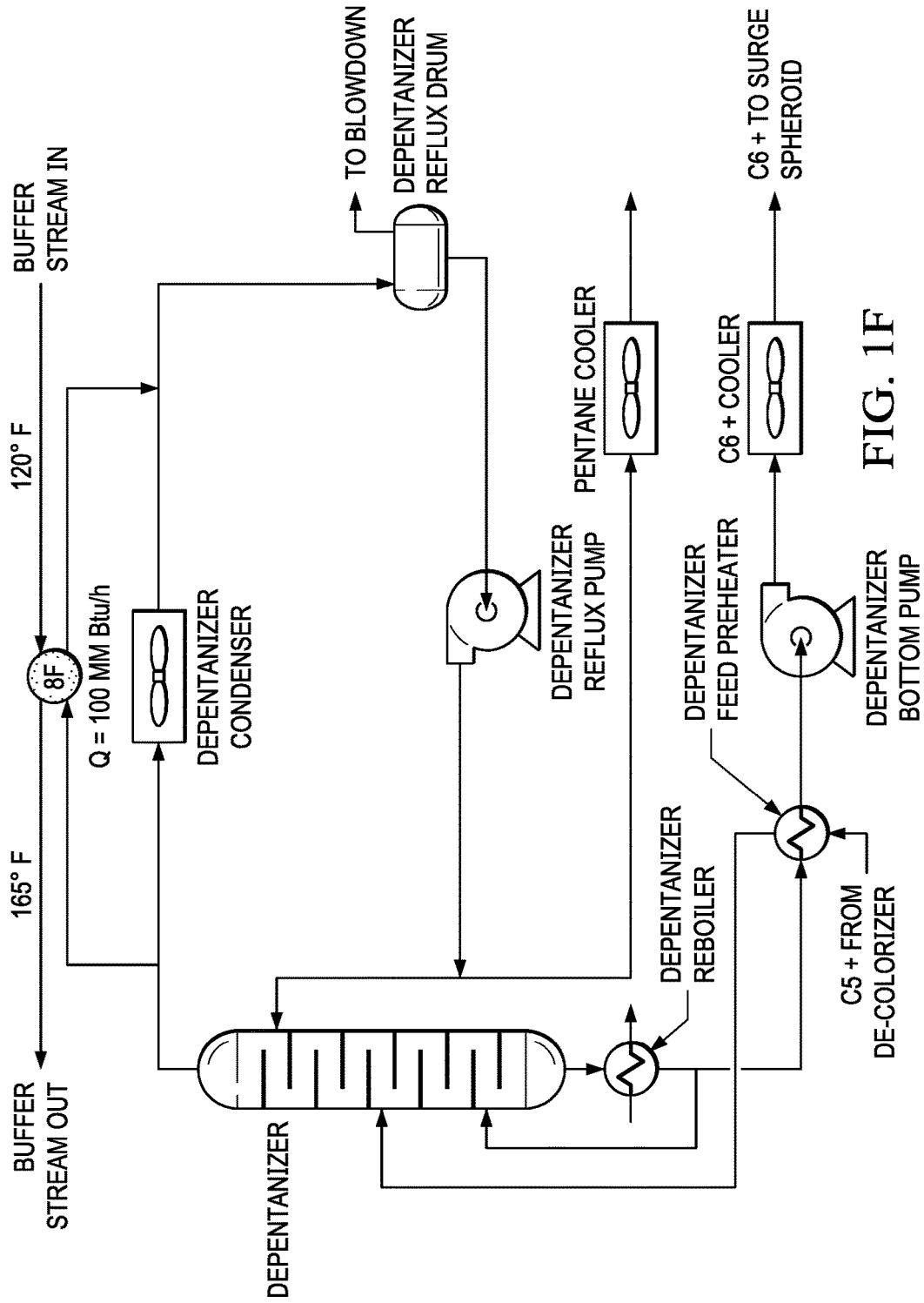
FIG. 1F is a schematic diagram of a de-pentanizer section waste heat recovery system in the NGL fractionation plant.

FIG. 1F is a schematic diagram of a de-pentanizer section waste heat recovery system in the NGL fractionation plant. A sixth heat exchanger 8f is located in the de-pentanizer section of the NGL fractionation plant. The buffer fluid stream flows from the storage tank 805 to the sixth heat exchanger 8f to cool down the de-pentanizer overhead outlet stream. In turn, the temperature of the buffer fluid stream increases to between 160° F. and 170° F. (for example, about 165° F.). The heated buffer fluid stream flows to the collection header to join other pressurized water streams to flow to the triple cycle 809. The total thermal duty of the sixth heat exchanger 8f is between 95 MM Btu/h and 105 MM Btu/h (for example, about 100 MM Btu/h).

Figure 1G:
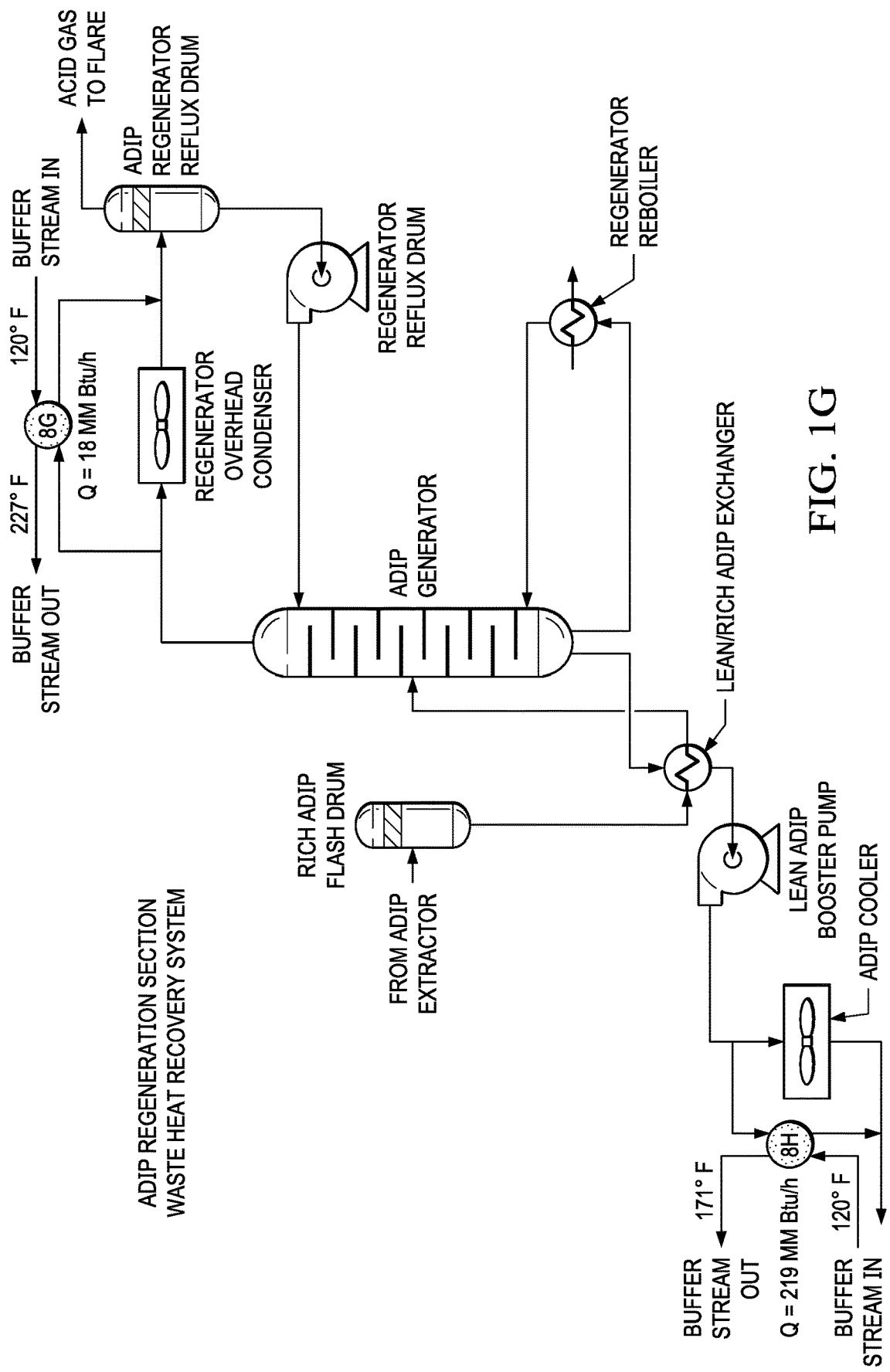
FIG. 1G is a schematic diagram of an ADIP regeneration section waste heat recovery system in the NGL fractionation plant.

FIG. 1G is a schematic diagram of an ADIP regeneration section waste heat recovery system in the NGL fractionation plant. A seventh heat exchanger 8g is located in the ADIP regeneration section of the NGL fractionation plant. The buffer fluid stream flows from the storage tank 805 to the seventh heat exchanger 8g to cool down the ADIP regeneration section overhead outlet stream. In turn, the temperature of the buffer fluid stream increases to between 220° F. and 230° F. (for example, about 227° F.). The heated buffer fluid stream flows to triple cycle 809. The total thermal duty of the seventh heat exchanger 8g is between 10 MM Btu/h and 20 MM Btu/h (for example, about 18 MM Btu/h).

An eighth heat exchanger 8h is located in the ADIP regeneration section of the NGL fractionation plant. The buffer fluid stream flows from the storage tank 805 to the eighth heat exchanger 8h to cool down the ADIP regeneration section bottoms outlet stream. In turn, the temperature of the buffer fluid stream increases to between 165° F. and 175° F. (for example, about 171° F.). The heated buffer fluid stream flows to the collection header to join other buffer fluid streams to flow to the triple cycle 809. The total thermal duty of the eighth heat exchanger 8h is between 215 MM Btu/h and 225 MM Btu/h (for example, about 219 MM Btu/h).

Figure 1H:
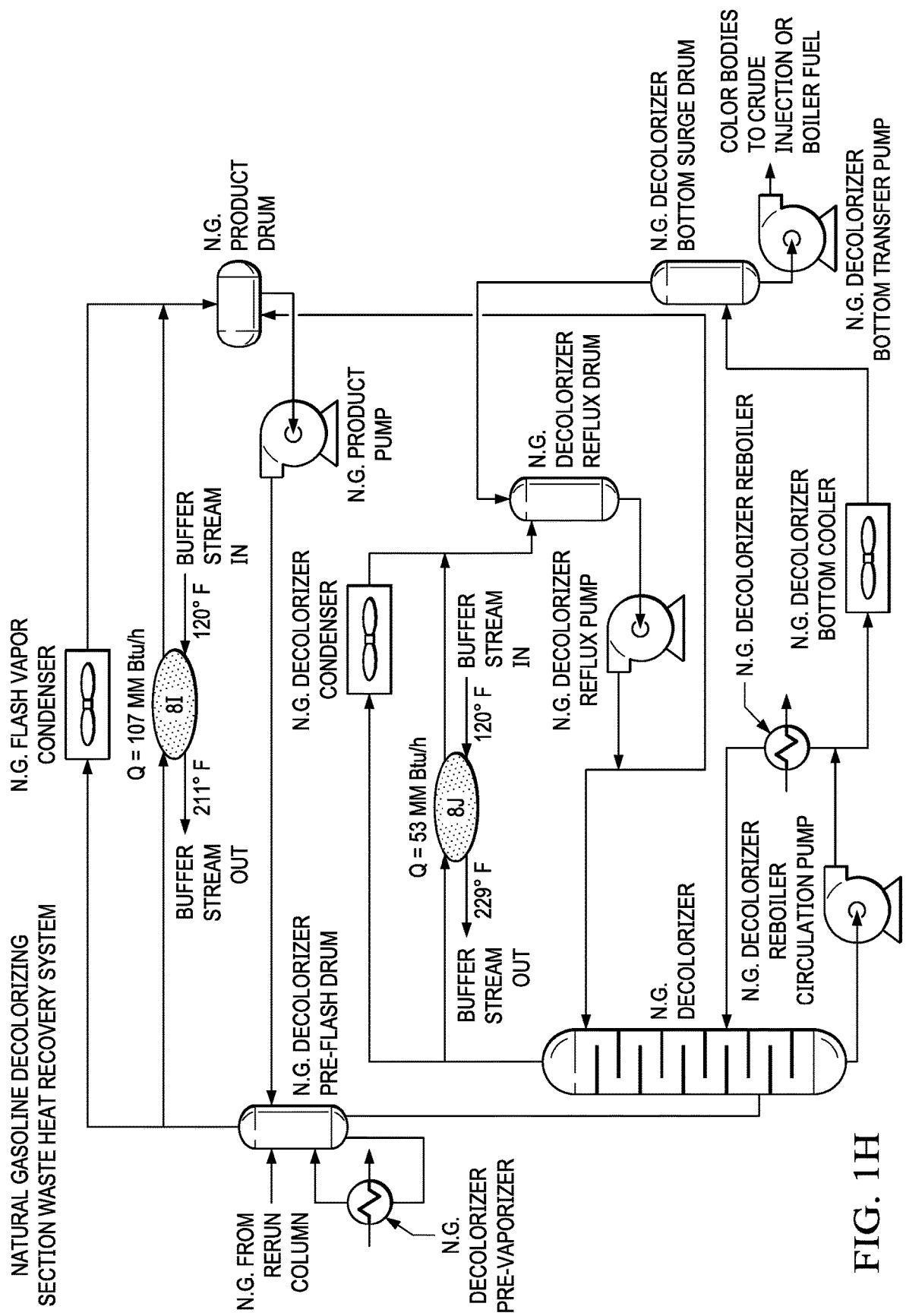
FIG. 1H is a schematic diagram of a natural gasoline de-colorizing section waste heat recovery system in the NGL fractionation plant.

FIG. 1H is a schematic diagram of a natural gasoline de-colorizing section waste heat recovery system in the NGL fractionation plant. A ninth heat exchanger 8i is located in the natural gasoline de-colorizing section of the NGL fractionation plant. The buffer fluid stream flows from the storage tank 805 to the ninth heat exchanger 8i to cool down the natural gas de-colorizing section pre-flash drum overhead outlet stream. In turn, the temperature of the buffer fluid stream increases to between 205° F. and 215° F. (for example, about 211° F.). The heated buffer fluid stream flows to the collection header to join other pressurized buffer fluid streams to flow to the triple cycle 809. The total thermal duty of the ninth heat exchanger 8i is between 100 MM Btu/h and 110 MM Btu/h (for example, about 107 MM Btu/h).

A tenth heat exchanger 8j is located in the natural gasoline de-colorizing section of the NGL fractionation plant. The buffer fluid stream flows from the storage tank 805 to the tenth heat exchanger 8j to cool down the natural gas de-colorizer overhead outlet stream. In turn, the temperature of the buffer fluid stream increases to between 225° F. and 235° F. (for example, about 229° F.). The heated buffer fluid stream flows to the collection header to join other buffer fluid streams to flow to the triple cycle 809. The total thermal duty of the tenth heat exchanger 8j is between 50 MM Btu/h and 55 MM Btu/h (for example, about 53 MM Btu/h).

Figure 1I:
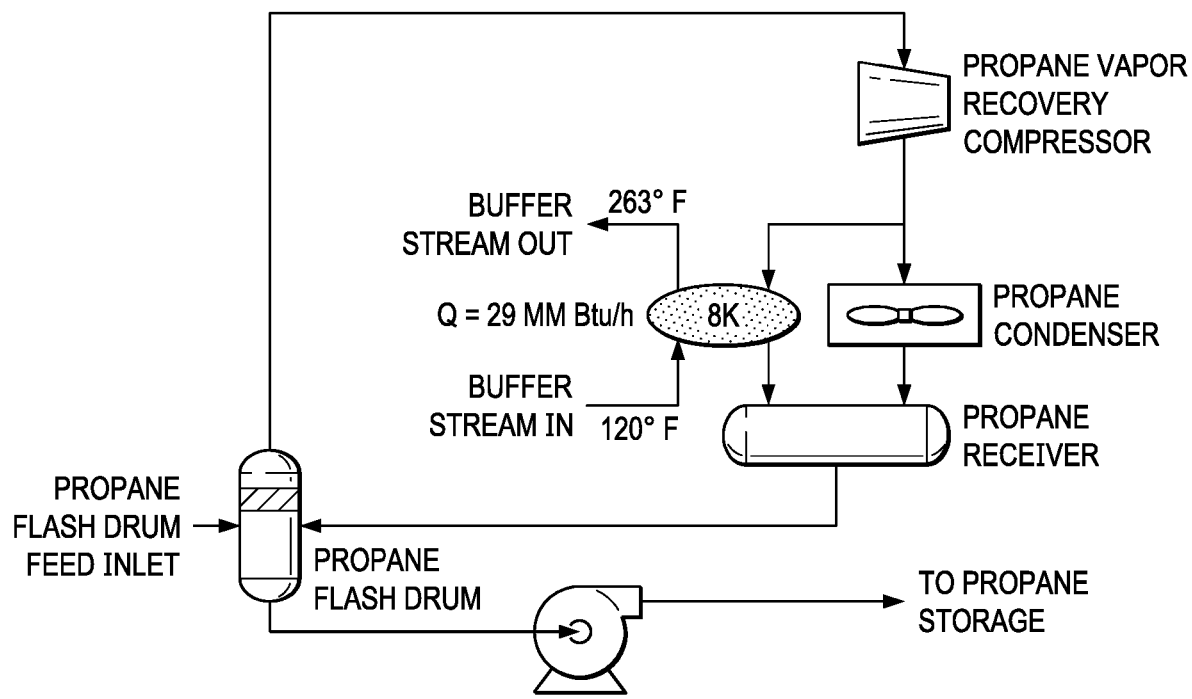
FIG. 1I is a schematic diagram of a propane tank vapor recovery section waste heat recovery system in the NGL fractionation plant.

FIG. 1I is a schematic diagram of a propane tank vapor recovery section waste heat recovery system in the NGL fractionation plant. An eleventh heat exchanger 8k is located in the propane tank vapor section of the NGL fractionation plant. The buffer fluid stream flows from the storage tank 805 to the eleventh heat exchanger 8k to cool down the propane vapor recovery compressor outlet stream. In turn, the temperature of the buffer fluid stream increases to between 260° F. and 270° F. (for example, about 263° F.). The heated buffer fluid stream flows to the collection header to join other buffer fluid streams to flow to the triple cycle 809. The total thermal duty of the eleventh heat exchanger 8k is between 25 MM Btu/h and 35 MM Btu/h (for example, about 29 MM Btu/h).

Figure 1J:
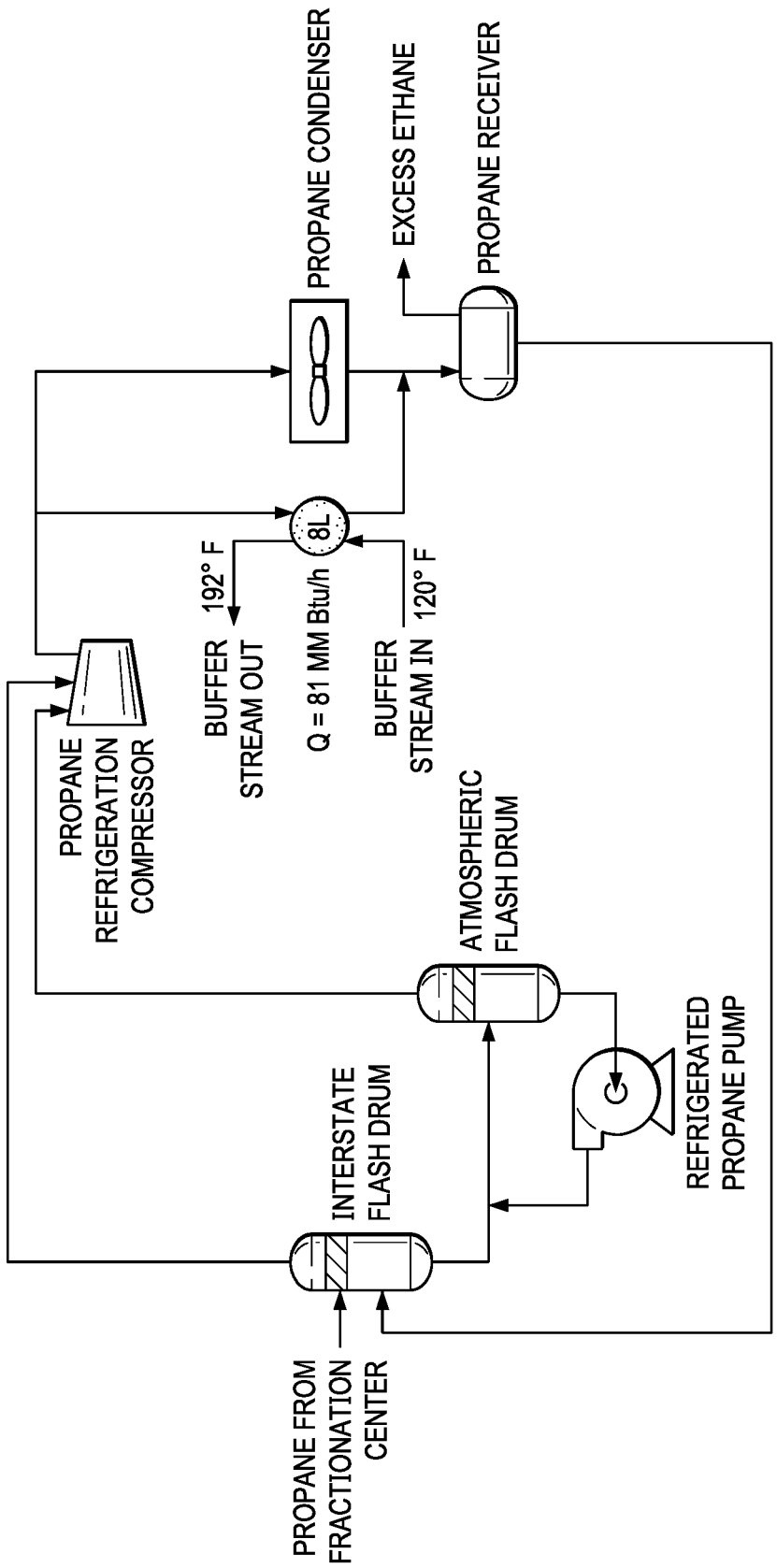
FIG. 1J is a schematic diagram of a propane product refrigeration section waste heat recovery system in the NGL fractionation plant.

FIG. 1J is a schematic diagram of a propane product refrigeration section waste heat recovery system in the NGL fractionation plant. A twelfth heat exchanger 8l is located in the propane product refrigeration section of the NGL fractionation plant. The buffer fluid stream flows from the storage tank 805 to the twelfth heat exchanger 8l to cool down the propane refrigeration compressor outlet stream. In turn, the temperature of the buffer fluid stream increases to between 185° F. and 195° F. (for example, about 192° F.). The heated buffer fluid stream flows to the collection header to join other buffer fluid streams to flow to triple cycle 809. The total thermal duty of the twelfth heat exchanger 8l is between 75 MM Btu/h and 85 MM Btu/h (for example, about 81 MM Btu/h).

Figure 1K:
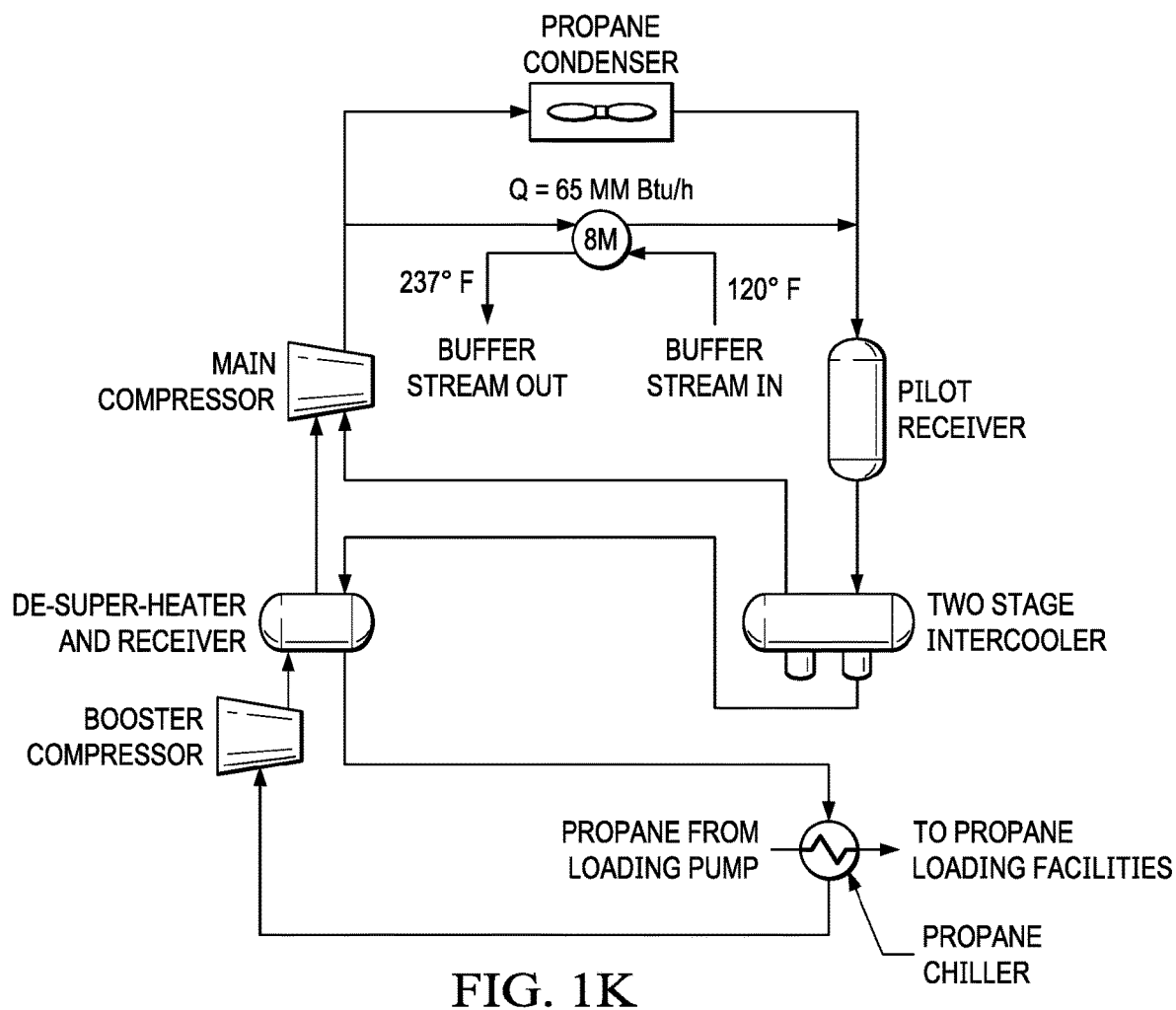
FIG. 1K is a schematic diagram of a propane product sub-cooling section waste heat recovery system in the NGL fractionation plant.

FIG. 1K is a schematic diagram of a propane product sub-cooling section waste heat recovery system in the NGL fractionation plant. A thirteenth heat exchanger 8m is located in the propane product sub-cooling section of the NGL fractionation plant. The buffer fluid stream flows from the storage tank 805 to the thirteenth heat exchanger 8m to cool down the propane main compressor outlet stream. In turn, the temperature of the buffer fluid stream increases to between 235° F. and 245° F. (for example, about 237° F.). The heated buffer fluid stream flows to the collection header to join other buffer fluid streams to flow to the triple cycle 809. The total thermal duty of the thirteenth heat exchanger 8m is between 60 MM Btu/h and 70 MM Btu/h (for example, about 65 MM Btu/h).

Figure 1L:
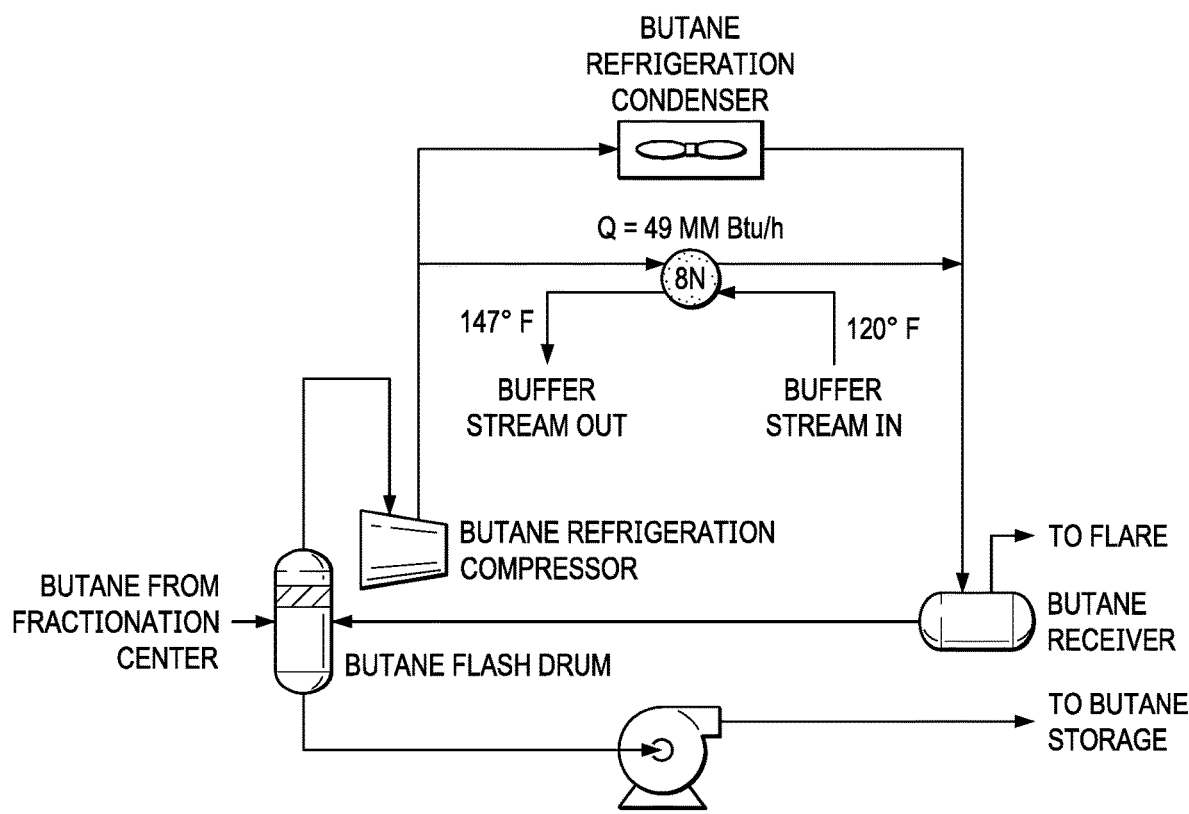
FIG. 1L is a schematic diagram of a butane product refrigeration waste heat recovery system in the NGL fractionation plant.

FIG. 1L is a schematic diagram of a butane product refrigeration waste heat recovery system in the NGL fractionation plant. A fourteenth heat exchanger 8n is located in the butane product refrigeration section of the NGL fractionation plant. The buffer fluid stream flows from the storage tank 805 to the fourteenth heat exchanger 8n to cool down the butane refrigeration compressor outlet stream. In turn, the temperature of the buffer fluid stream increases to between 140° F. and 150° F. (for example, about 147° F.). The heated buffer fluid stream flows to the collection header to join other buffer fluid streams to flow to the triple cycle 809. The total thermal duty of the fourteenth heat exchanger 8n is between 45 MM Btu/h and 55 MM Btu/h (for example, about 49 MM Btu/h).

Figure 1M:
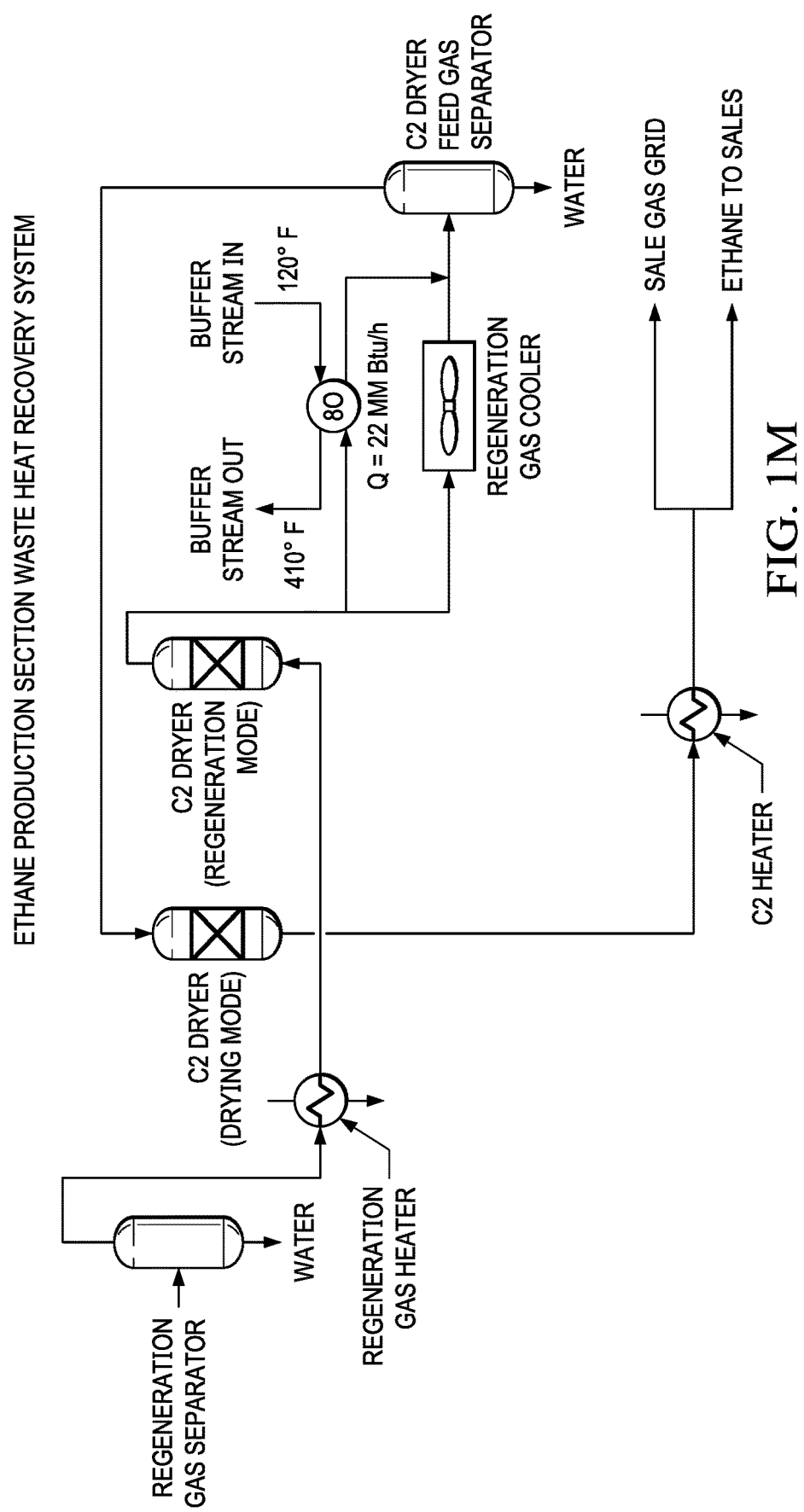
FIG. 1M is a schematic diagram of an ethane production section waste heat recovery system in the NGL fractionation plant.

FIG. 1M is a schematic diagram of an ethane production section waste heat recovery system in the NGL fractionation plant. A fifteenth heat exchanger 8o is located in the ethane production section of the NGL fractionation plant. The buffer fluid stream flows from the storage tank 805 to the fifteenth heat exchanger 8o to cool down the ethane dryer outlet stream during the generation mode. In turn, the temperature of the buffer fluid stream increases to between 405° F. and 415° F. (for example, about 410° F.). The heated buffer fluid stream flows to the collection header to join other buffer fluid streams to flow to the triple cycle 809. The total thermal duty of the fifteenth heat exchanger 8o is between 20 MM Btu/h and 30 MM Btu/h (for example, about 22 MM Btu/h).

Figure 1N:
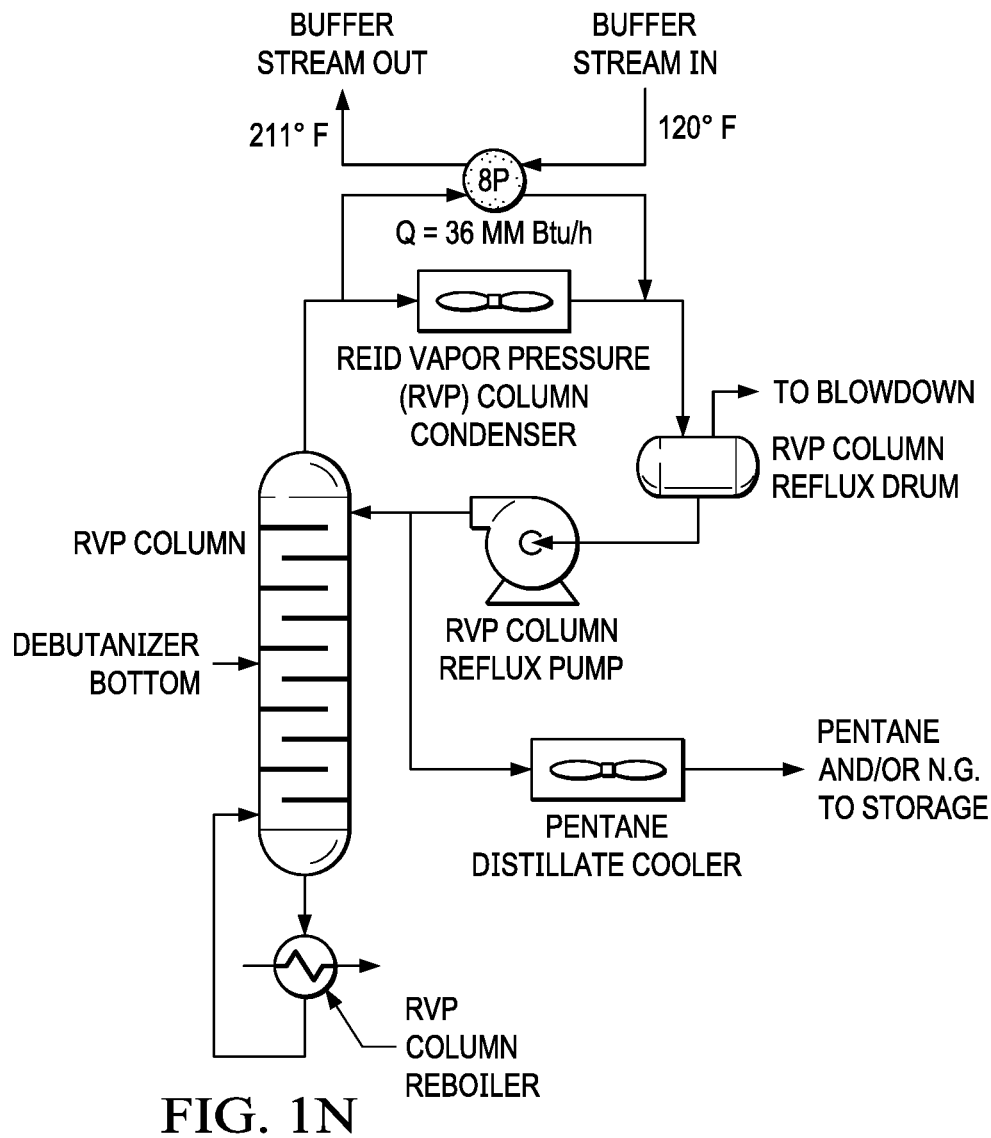
FIG. 1N is a schematic diagram of a natural gasoline vapor pressure control section waste heat recovery system in the NGL fractionation plant.
Figure 10:
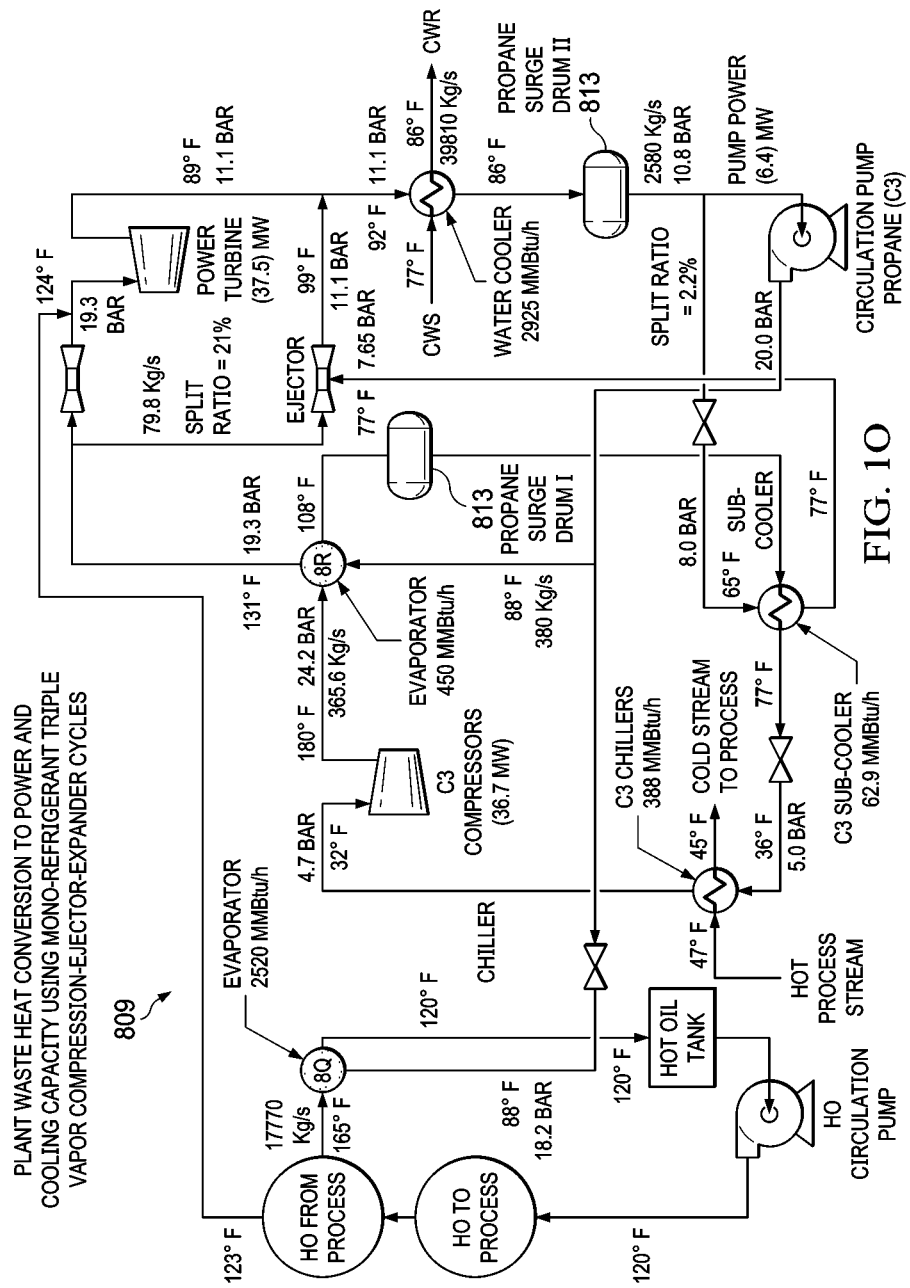

FIG. 1N is a schematic diagram of a natural gasoline vapor pressure control section waste heat recovery system in the NGL fractionation plant. A sixteenth heat exchanger 8p is located in the natural gasoline vapor pressure control section of the NGL fractionation plant. The buffer fluid stream flows from the storage tank 805 to the sixteenth heat exchanger 8p to cool down the RVP control column overhead outlet stream. In turn, the temperature of the buffer fluid stream increases to between 205° F. and 215° F. (for example, about 211° F.). The heated buffer fluid stream flows to the collection header to join other buffer fluid streams to flow to the triple cycle 809. The total thermal duty of the sixteenth heat exchanger 8p is between 30 MM Btu/h and 40 MM Btu/h (for example, about 36 MM Btu/h).

FIG. 1O is a schematic diagram of a mono-refrigerant triple vapor compression-ejector-expander cycle 809. The mono-refrigerant used is propane liquid at two, identified, unique, operating pressures. The propane liquid can be implemented to serve the mechanical compression refrigeration cycle waste heat recovery and to use the waste heat recovered from the NGL fractionation plant to generate power, for example, in an Organic Rankine Cycle (ORC) to generate between 30 MW and 40 MW (for example, 37.5 MW) of power. In other words, the heated propane is used in the main refrigeration cycle compressor power consumption to be used in the NGL fractionation plant and for sub-cooling the compressor outlet stream of the ejector refrigeration cycle. The propane liquid can also enable the ejector refrigeration cycle to support the compressor outlet stream via sub-cooling using thermal duty of between 60 MM Btu/h and 70 MM Btu/h (for example, 62.9 MM Btu/h) to reduce the main refrigeration cycle compressor power consumption for the NGL fractionation plant by between 5 MW and 15 MW (for example 10 MW) which is about 21% of the refrigeration package power consumption.

In some implementations, the high pressure liquid propane is used to directly recover the waste heat in the NGL fractionation plant waste heat streams and the de-ethanizer overhead stream refrigeration compressor. To do so, two heat exchangers (for example a $17^{th}$ heat exchanger 8q and an $18^{th}$ heat exchanger 8r) are implemented. The thermal duty of the $17^{th}$ heat exchanger 8q is between 2500 MM Btu/h and 2600 MM Btu/h (for example, 2520 MM Btu/h). The thermal duty of the $18^{th}$ heat exchanger 8r is between 400 MM Btu/h and 500 MM Btu/h (for example, 450 MM Btu/h).

The high pressure liquid propane at a pressure of between 15 bar and 25 bar (for example, about 20 bar) and a temperature of between 85° F. is and 95° F. (for example, 88° F.) is fully vaporized in the $17^{th}$ heat exchanger 8q and the $18^{th}$ heat exchanger 8r. The vaporized propane is directed to work as a motive stream to produce power in a turbine and to compress another low pressure propane stream used in the sub-cooling of the refrigeration compressors outlet stream using vapor ejectors. In the compressor-ejector cycle, the liquid propane stream branch flows from a high pressure feed drum at a pressure between 20 bar and 30 bar (for example, 24 bar located after the refrigeration compressor after-cooler to a new heat exchanger unit that has a thermal load of between 60 MM Btu/h and 65 MM Btu/h (for example, 62.9 MM Btu/h).

The heat exchanger unit (sometimes called a sub-cooler) uses another stream of liquid propane from the ejector cycle. The first working fluid is at a pressure between five bar and 15 bar (for example, 10.8 bar) downstream of the propane surge drum. A small portion of this first working fluid (for example about 2.2%) is throttled in a throttling valve to a pressure between five bar and 10 bar (for example, 8 bar) to generate chilling capacity at a temperature between 60° F. and 70° F. (for example, about 65° F.) for a thermal load of between 60 MM Btu/h and 70 MM Btu/h (for example, 63 MM Btu/h). The chilling capacity of the first working fluid is sufficient to satisfy the needs of the NGL fractionation plant de-ethanizer overhead stream propane refrigeration compressor stream sub-cooling.

The first working fluid second propane stream is pumped to a higher pressure of between 15 bar and 25 bar (for example, about 20 bar). The higher pressure remainder of the first working fluid second propane stream is divided into two streams—the first (for example, about 85%) to stream going to the NGL fractionation plant heat exchanger network 807 to extract from the buffer fluid, its waste heat, the second (for example, about 15%) going to the propane compressors cycle to extract waste heat from the propane compressors outlet streams. The two propane vapor streams—the first out of the sub-cooler at a temperature of between 50° F. and 60° F. (for example, 55° F.) and a pressure between 3 bar and 10 bar (for example, 5.9 bar), and the second out of the $18^{th}$ heat exchanger at a temperature between 125° F. and 135° F. (for example, 131° F. and a pressure between 15 bar and 25 bar (for example, 19.3 bar)—are mixed in a customized ejector to get a vapor stream at the desired pressure for condensation using cooling water at a temperature between 70° F. and 80° F. (for example, 77° F.). The mixed propane streams are further mixed with the turbine outlet vapor stream and then flowed to the cycle water cooler. The mixed propane stream out of the ejector at a pressure of between 5 bar and 15 bar (for example, 11 bar) and a temperature of between 95° F. and 105° F. (for example, 99° F.) and from the turbine at a pressure of between 5 bar and 15 bar (for example, 11 bar) and a temperature between 85° F. and 95° F. (for example, 89° F.) is condensed using the water cooler. The liquid propane is then flowed to the ejector cycle for the compressor stream sub-cooling using the compressors low grade waste heat directly and the heat exchanger network 607 in the NGL fractionation plant to simultaneously continue the power generation cycle.

By implementing the techniques disclosed here, low grade waste heat can be recovered to generate deep cooling using mechanical refrigeration. Such deep cooling can be used to partially or fully satisfy cooling requirements of sections of the NGL fractionation plant, for example, the de-ethanizer section. The low grade waste heat can also be used to generate power.

Thus, particular implementations of the subject matter have been described. Other implementations are within the scope of the following claims.

The invention claimed is:
1. A method of recovering heat from a Natural Gas Liquid (NGL) fractionation plant via a waste heat recovery heat exchanger network having heat exchangers, the method comprising:
  heating a buffer fluid in a heat exchanger in the waste heat recovery heat exchanger network with a stream from the NGL fractionation plant, the NGL fractionation plant comprising a dehydrator vessel and a distillation column;
  discharging the buffer fluid from the heat exchanger through a collection header conduit to an integrated triple cycle system comprising an ejector, an evaporator heat exchanger, a compressor, and a power turbine; and
  generating cooling capacity for the NGL fractionation plant via the integrated triple cycle system with heat from the buffer fluid.

2. The method of claim 1, wherein the stream comprises an outlet stream from the dehydrator vessel, and wherein the dehydrator vessel comprises a propane dehydrator or a butane dehydrator.

3. The method of claim 1, wherein the stream comprises an outlet stream from the distillation column.

4. The method of claim 3, wherein the distillation column is a de-propanizer distillation column, a de-pentanizer distillation column, a natural gas (NG) decolorizer distillation column, or a Reid Vapor Pressure (RVP) control distillation column, and wherein the outlet stream comprises an overhead outlet stream from the distillation column.

5. The method of claim 3, wherein the distillation column is a de-butanizer distillation column or an Amine-Di-Iso-Propanol (ADIP) regeneration distillation column, and wherein the outlet stream comprises an overhead outlet stream from the distillation column or a bottoms outlet stream from the distillation column.

6. The method of claim 1, comprising feeding the distillation column from a pre-flash drum, wherein the distillation column comprises an NG decolorizer distillation column, and wherein the stream comprises an overhead outlet stream from the pre-flash drum.

7. The method of claim 1, wherein generating cooling capacity comprises generating cooling capacity via a mechanical compression cycle of the integrated triple cycle system with heat from the buffer fluid.

8. A method of recovering heat from a Natural Gas Liquid (NGL) fractionation plant via a waste heat recovery heat exchanger network having heat exchangers, the method comprising:
flowing a buffer fluid from a storage tank to a heat exchanger in the waste heat recovery heat exchanger network;
heating the buffer fluid via the heat exchanger with a stream from the NGL fractionation plant, the NGL fractionation plant comprising a distillation column and a compressor;
discharging the buffer fluid from the heat exchanger via a collection header conduit to an integrated triple cycle system comprising an ejector, an evaporator heat exchanger and a power turbine; and
generating cooling capacity for the NGL fractionation plant via the integrated triple cycle system with heat from the buffer fluid.

9. The method of claim 8, wherein generating cooling capacity comprises vaporizing a second buffer fluid with the evaporator heat exchanger with heat from the buffer fluid.

10. The method of claim 9, wherein the buffer fluid comprises water or oil, and wherein the second buffer fluid comprises refrigerant.

11. The method of claim 10, wherein the refrigerant comprises propane.

12. The method of claim 9, comprising flowing the buffer fluid from the evaporator heat exchanger to the first storage tank.

13. The method of claim 9, comprising flowing the second buffer fluid from a second storage tank to the evaporator heat exchanger.

14. The method of claim 8, wherein the stream comprises an outlet stream from the compressor.

15. The method of claim 14, wherein the compressor comprises a propane vapor recovery compressor, or wherein the compressor comprises a propane refrigeration compressor in a propane product refrigeration section.

16. The method of claim 14, wherein the NGL fractionation plant comprises a propane product sub-cooling section comprising the compressor.

17. The method of claim 14, wherein the compressor comprises a butane refrigeration compressor.

18. A method of recovering heat from a Natural Gas Liquid (NGL) fractionation plant via a waste heat recovery heat exchanger network having heat exchangers for generating cooling capacity, the method comprising:
heating a buffer fluid via a heat exchanger in the waste heat recovery heat exchanger network with a stream from the NGL fractionation plant, the NGL fractionation plant comprising a distillation column;
discharging the buffer fluid via a collection header conduit to an integrated triple cycle system comprising an ejector, an evaporator heat exchanger, a compressor, and a power turbine;
generating cooling capacity for the NGL fractionation plant via the integrated triple cycle system with heat from the buffer fluid; and
flowing the buffer fluid from the integrated triple cycle system to a storage tank.

19. The method of claim 18, wherein the stream comprises an outlet stream from an ethane dryer column in the NGL fractionation plant.

20. The method of claim 18, wherein the integrated triple cycle system comprises a second evaporator heat exchanger.

21. The method of claim 18, comprising generating power with the ORC of the integrated triple cycle system.

* * * * *